US010672138B2

(12) United States Patent
Germain et al.

(10) Patent No.: US 10,672,138 B2
(45) Date of Patent: Jun. 2, 2020

(54) SYSTEM AND METHOD FOR ESTIMATING A HARVEST VOLUME IN A VINEYARD OPERATION

(71) Applicants: UNIVERSITÉ DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR); ÉCOLE NATIONALE SUPÉRIEURE DES SCIENCES AGRONOMIQUES DE BORDEAUX (BORDEAUX SCIENCES AGRO), Gradignan (FR)

(72) Inventors: Christian Germain, Cestas (FR); Barna Keresztes, Bordeaux (FR); Gilbert Grenier, Pessac (FR); Olivier Lavialle, Gradignan (FR); Jean-Pierre Da Costa, Martillac (FR)

(73) Assignees: UNIVERSITÉ DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR); É COLE NATIONALE SUPERIÉ URE DES SCIENCES AGRONONOMIQUES DE BORDEAUX (BORDEAUX SCIENCES AGRO), Gradignan (FR)

( * ) Notice: Subject to any disclaimer, the term of this patent is extended or adjusted under 35 U.S.C. 154(b) by 0 days.

(21) Appl. No.: 15/578,062

(22) PCT Filed: May 30, 2016

(86) PCT No.: PCT/FR2016/051279
§ 371 (c)(1),
(2) Date: Nov. 29, 2017

(87) PCT Pub. No.: WO2016/193602
PCT Pub. Date: Dec. 8, 2016

(65) Prior Publication Data
US 2018/0158207 A1 Jun. 7, 2018

(30) Foreign Application Priority Data

May 29, 2015 (FR) ...................................... 15 54862

(51) Int. Cl.
*G06T 7/62* (2017.01)
*G06K 9/00* (2006.01)
(Continued)

(52) U.S. Cl.
CPC ................ *G06T 7/62* (2017.01); *A01G 17/02* (2013.01); *G06F 17/18* (2013.01);
(Continued)

(58) Field of Classification Search
CPC ......... G06T 7/62; G06T 7/0002; G06F 17/18; A01G 17/02; G06K 9/00697
See application file for complete search history.

(56) References Cited

U.S. PATENT DOCUMENTS

2018/0129894 A1* 5/2018 Nuske ....................... G06T 7/62

OTHER PUBLICATIONS

Grocholsky, B., et al., "A Camera and Laser System for Automatic Vine Balance Assessment," Written for presentation at the 2011 ASABE Annual International Meeting Sponsored by ASABE, Jan. 1, 2011, XP055263631, retrieved from the Internet on Apr. 8, 2016 at http://www.cascrop.com/publications/2011_ASABE_Grocholsky_ACameraandLaserSystem.pdf., pp. 1-16.
(Continued)

*Primary Examiner* — Leon Flores
(74) *Attorney, Agent, or Firm* — Kenealy Vaidya LLP

(57) ABSTRACT

Some embodiments are related to a system for estimating a harvest volume in a vineyard operation organized into rows of vine stocks, including: a photographic device for capturing a photographic image of a set of stocks when the system passes between two rows of the vineyard operation; a device for measuring a distance between the vine stocks and the photographic device; and a calculator for detecting the
(Continued)

berries within the photographic image, determining a number of berries in a bunch, determining a number of bunches on a stock, and determining an indicator of the volume depending on the number of berries in a bunch, the number of bunches on a stock and the diameter of the berries determined from the photographic image and the distance measurement.

20 Claims, 1 Drawing Sheet

(51) Int. Cl.
      *A01G 17/02*       (2006.01)
      *G06T 7/00*       (2017.01)
      *G06F 17/18*       (2006.01)
      *G06Q 50/02*       (2012.01)

(52) U.S. Cl.
    CPC ........ *G06K 9/00697* (2013.01); *G06T 7/0002* (2013.01); *G06K 2209/17* (2013.01); *G06Q 50/02* (2013.01); *G06T 2207/30128* (2013.01); *G06T 2207/30188* (2013.01); *G06T 2207/30242* (2013.01)

(56) References Cited

OTHER PUBLICATIONS

Nuske, S., et al., "Yield estimation in vineyards by visual grape detection," Intelligent Robots and Systems (IROS), 2011 IEEE/RSJ International Conference ON, IEEE, Sep. 25, 2011, pp. 2353-2358, XP032201266.

Nuske, S., et al., "Automated Visual Yield Estimation in Vineyards," J. Field Robotics, vol. 31, No. 5, Aug. 11, 2014, pp. 837-860, XP055263684.

Liu, S., et al., "Automatic grape bunch detection in vineyards for precise yield estimation," 2015 14th IAPR International Conference on Machine Vision Applications (MVA), May 1, 2015, pp. 238-241, XP055263630.

International Search Report for PCT Patent App. No. PCT/FR2016/051279 (dated Sep. 16, 2016) with English language translation thereof.

Written Opinion for PCT Patent App. No. PCT/FR2016/051279 (dated Sep. 16, 2016).

\* cited by examiner

SYSTEM AND METHOD FOR ESTIMATING A HARVEST VOLUME IN A VINEYARD OPERATION

CROSS REFERENCE TO RELATED APPLICATION(S)

This application is a national phase filing under 35 C.F.R. § 371 of and claims priority to PCT Patent Application No. PCT/FR2016/051279, filed on May 30, 2016, which claims the priority benefit under 35 U.S.C. § 119 of French Patent Application No. 1554862, filed on May 29, 2015, the contents of each of which are hereby incorporated in their entireties by reference.

BACKGROUND

Some embodiments relate to vineyard agriculture. More precisely, some embodiments relate to an automatic tool for aiding the estimation of a harvest volume in a vine.

In order to best or better manage a vine, a winegrower must or should have an estimation of the volume of grape berry harvest. This estimation may in particular enable them to anticipate the human and hardware devices to be put in place in order to carry out the harvest efficiently, to optimize or enhance the organization of the harvest.

This estimation may be determined per plot of a vine, insofar as the conditions in respect of terroir, micro-climates, pruning and crop strategy, etc. may influence the evolution of the vine in a very local manner.

Furthermore, the evolution of this estimation may serve them as parameter to determine the best or better moment to carry out this harvest. It may also make it possible to detect anomalies of development of the grape berries.

In general, this knowledge is empirical or constructed manually. A wine-producer must or should therefore pass among the vines so as to determine a certain number of parameters, in particular the number of clusters per foot of vine and the mean weight of a cluster. In so far as it is humanly difficult to determine these measurements for the whole of a vine, a sampling must or should be performed. This sampling must or should be performed in as random a manner as possible and without human bias. The number of samples depends on the desired precision and on the variance within the geographical zone studied.

It follows therefrom that this scheme is complex to implement and also very time consuming. The error rate is furthermore fairly significant, generally between 20% and 50% and may attain 200% in certain cases. The article by P. Clingeleffer, G. Dunn, M. Krstic and S. Martin, "Crop development, crop estimation and crop control to secure quality and production of major wine grape varieties: A national approach", in Technical Report, Grape and Wine Research and Development Corporation, Australia, 2001, may be consulted in this regard.

Furthermore, in order to obtain a satisfactory estimation, it is apparent that several samplings per season may be desired in this embodiment. This results in the destruction of an appreciable number of berries.

Moreover, automatic schemes have been contemplated for improving the process of estimating a harvest volume.

For example, the article "Yield Estimation in Vineyards: Experiments with Different Varietals and Calibration Procedure" by Stephen Nuske et al. in *"Proceedings of Intelligent Robots and Systems (IROS)"*, 2011 *IEEE/RSJ International Conference* 25-30 Sep. 2011, describes such a method.

The yield of the harvest is estimated on the basis of the number of berries counted automatically by the vehicle and by comparing this number with data from the previous year.

SUMMARY

However, this method does not give satisfactory results and its result depends on the values obtained previously. Furthermore, the mechanism described relies on taking a snapshot picture in the vines and a subsequent step of digital processing of the images obtained must or should be performed in a remote center away from the vines. Furthermore, the method of data capture is complex and expensive on account of the 3D cameras.

Some embodiments are thus directed to a system and a method which at least partially address or alleviate the aforementioned drawbacks.

Some embodiments are directed to a method for estimating a harvest volume within a vineyard operation organized by row of vine stems, including:

capture of a photographic image of a set of vine stems, by photographic device secured to an automatic system circulating between two rows of vine stems;

detection of the berries within the photographic image;

estimation of a number of berries on a cluster;

estimation of a number of clusters on a stem of the set; and estimation of the volume on the basis of the number of berries on a cluster, of the number of clusters on a stem and of the diameter of the berries which is determined on the basis of the photographic image and of a measurement of distance between the set of vine stems and the automatic system.

Some embodiments include one or more of the following characteristics which can be used separately or in partial combination with one another or in total combination with one another:

the detection of berries includes the determination of circular shapes within the photographic image;

the determination of a number of berries on a cluster includes the use of an experimental model relating a number of berries that are visible on a photographic image to the number of berries on a cluster;

the number of clusters on a stem is determined by a chart dependent on the cultivar of the stem and the vine handling technique implemented by the operator of the vineyard operation;

the harvest volume is dependent on a geographical location.

Some other embodiments relate to a system for estimating a harvest volume within a vineyard operation organized by rows of vine stems, including:

a photographic device for capturing a photographic image of a set of vine stems, when the system circulates between two rows of the vineyard operation;

a measuring device for measuring a distance between the set of vine stems and the photographic device; and a calculator for detecting berries within the photographic image, for determining a number of berries on a cluster, for determining a number of clusters on a stem of the set and for determining an indicator of the volume as a function of the number of berries on a cluster, of the number of clusters on a stem and of the diameter of the berries which is determined on the basis of the photographic image and of the distance measurement.

Some embodiments include one or more of the following characteristics which can be used separately or in partial combination with one another or in total combination with one another:
- the calculator is designed to detect the berries by determining circular shapes within the photographic image;
- the calculator is designed to determine a number of berries on a cluster by using an experimental model relating a number of berries that are visible on a photographic image to the number of berries on a cluster;
- the calculator is designed to determine the number of clusters on a stem as a function of a chart dependent on the cultivar of the stem and the vine handling technique implemented by the operator of the vineyard operation.
- the system furthermore includes a location device so as to render the harvest volume dependent on a geographical location.

Another aspect of some embodiments relates to a vehicle including a system such as defined above.

Other characteristics and advantages of some embodiments will become apparent on reading the description which follows of a preferred embodiment of some embodiments, given by way of example and with reference to the appended drawings.

DETAILED DESCRIPTION OF THE EMBODIMENTS

Typically, a vineyard operation is organized by rows of vine stems, so as to allow the operator to circulate between each row, including with the use of a vehicle.

Figure 1:
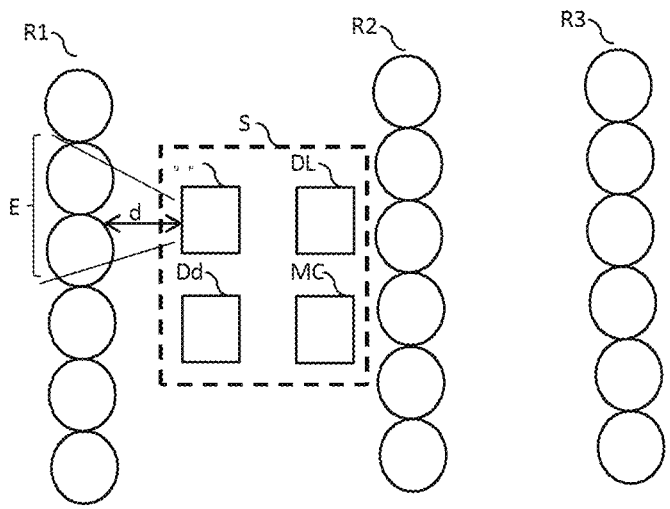
FIG. 1 schematically represents an exemplary implementation of some embodiments.

As represented in FIG. 1, the system S according to some embodiments is designed to circulate between two rows R1, R2 of the vineyard operation.

This system can be carried by a member of staff of the agricultural operation. One way it can be secured to a vehicle which can be hauled by a member of staff or else be an automotive vehicle. According to one embodiment, this automotive vehicle can be a robot.

The vehicle can take the form of a tractor, a quad bike, a high-clearance tractor, etc.

Figure 3:
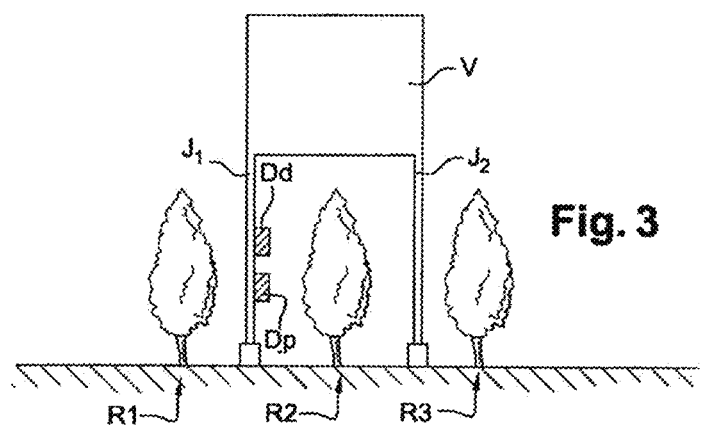
FIG. 3 schematically represents an exemplary embodiment of some embodiments by way of a high-clearance tractor.

FIG. 3 illustrates the particular case of a high-clearance tractor vehicle V. This figure shows a vine according to a transverse section. Three rows R1, R2, R3 are featured. The high-clearance tractor is a vehicle including two legs J1, J2 terminating in wheels and adapted to roll in the furrows formed by two successive rows. Each leg can roll in a distinct furrow separate from the other, so that the body of the high-clearance tractor can be situated above the vines. This body can include a cab in which a driver sits.

The photographic device and a distance measuring device, which will be described below, can be situated on one of the legs of the high-clearance tractor, level with the height of the vine grape clusters.

In a general manner, the system S has a photographic device DP disposed so as to be able to capture photographic images of the vine stems. This photographic device is suitable for capturing photographic images. It may therefore be a digital photographic apparatus, or else a video camera, or any other appropriate device.

One way it may be disposed so that the snapshot picture-taking axis is perpendicular to the axis of the rows of vine stems and, therefore, of the axis of movement of the system.

This photographic device DP is disposed in the system S so that its elevation with respect to the ground corresponds substantially to that of the grape clusters. This elevation can therefore be a parameter adjustable as a function of the type of vine (cultivar) and of the manner in which the operator prunes and operates their vine.

Thus, the photographic device DP can capture photographic images corresponding to the entirety of a row as the system moves between two rows. However, each photographic image corresponds to a set E, dependent on the distance d between the vine stems and the photographic device DP as well as on the aperture angle of the latter. This set E corresponds to a set of vine stems, which may optionally be reduced to a single vine stem.

The system S can thus be designed so as to capture several series of photographic images each covering contiguous sets, so that the set of photographic images for a row covers the set of vine stems of a row.

According to another embodiment, the system S captures photographic images according to a determined tempo, generally periodic, which may be dependent on the speed of movement of the system. It may furthermore have calculators MC designed to determine the overlaps between photographic images so as to avoid taking one and the same photographed aspect (cluster, stem, berry, etc.) into account several times.

According to one embodiment, a sampling can be put in place so as to capture photographic images of just a part of a row. This sampling can be driven by a random generator so as to avoid any bias. In a preferential manner, this sampling is carried out on an appreciable fraction of the row.

Provision may moreover be made for the system S to have a lighting device, so as in particular to allow the capture of photographic images whatever the natural lighting conditions, and also to standardize these conditions from one photographic image to the next. The lighting device can in particular be chosen from among various possible lightings such as a halogen lamp, LED-based lighting, a flash lamp, stroboscopic or continuous, etc.

The photographic device can be adapted to capture photographic images of various kinds. In particular, the captured photographic images may be monospectral, multispectral, hyperspectral, etc. Spectro-imaging, also called "hyperspectral" imaging as opposed to "multispectral" or "superspectral" imaging, is a technology allowing the representation of a scene according to a large number of narrow (≤10 nm) and contiguous spectral bands (generally more than a hundred).

Moreover, the photographic device can function according to various wavelength ranges. It can function in visible light, and also in the ultraviolet or in the infrared.

In a preferential manner, the photographic device can function in the visible domain and according to 3 bands: red, green, blue, so as to generate a color photographic image.

The subsequent description will in general be concerned with the processing of a given photographic image, corresponding to a set E of vine stems.

The switch from an estimation of a harvest volume corresponding to an image to a given zone of a vineyard operation can be performed in various ways, depending on the way in which the photographic images were captured.

According to one embodiment of some embodiments, the system can have two photographic devices so as to capture, in parallel, photographic images of the two opposite rows. Thus, a first photographic device DP can be situated on the left of the system S (in FIG. 1) and capture photographic images of the row R1, while a second device, not represented in the figure, is situated on the right and captures photographic images of the row R2.

Of course, other implementations are possible, having for example more than two photographic devices.

The photographic images provided by the photographic device or devices DP are digital images allowing their processing by the calculators MC, also onboard the system S.

These calculators are designed to:
detect berries within the photographic image representing the set E,
estimate a number of berries on a cluster,
estimate a number of clusters on a stem of the set E and
estimate the harvest volume, on the basis, or as a function, of this number of clusters per stem and of the diameter of the berries determined on the basis of the photographic image and of a measurement of the distance d. This estimation of the volume can be carried out through a statistical approximation starting from these elements.

The system S may furthermore include a device Dd for measuring a distance d between the set of vine stems and the photographic device DP. These devices may be a telemeter for example. As will be seen later, this distance allows a scaling of the captured image and makes it possible to transform a measurement in number of pixels into a size in centimeters.

According to certain embodiments, the distance measuring device Dd (telemeters) can be integrated within the photographic devices DP.

The detection of the grape berries in a digital image can be performed in various ways.

According to one embodiment of some embodiments, the calculators MC determine the circular shapes within the digital image by detecting circular arcs. Indeed, a berry may be partially masked by another berry situated in a plane closer to the photographic device, so that only a circular arc is detectable. On the basis of the circular arcs detected, it is possible to deduce therefrom the visible berries.

The calculators MC can thereafter estimate the number of these berries (totally or partially visible) in the photographic image, as well as the diameter of the berries. A mean diameter can be determined at this stage, or else the diameters of each berry can be stored so as to allow more complex statistical calculations.

The calculators MC are thereafter designed to determine a number of berries on a cluster.

Indeed, a photographic image makes it possible to provide only a two-dimensional view of a set of clusters. However, a cluster is a three-dimensional aspect, a part of which is masked since it is opposite the photographic device.

Various stereological techniques are possible for performing this switch to three dimensions so as to estimate a number of berries on a cluster on the basis of a number of the number of visible berries which was determined previously.

A possible implementation can include or can consist of using an experimental model relating a number of berries that are visible on a photographic image to the number of berries on a cluster.

Figure 2:
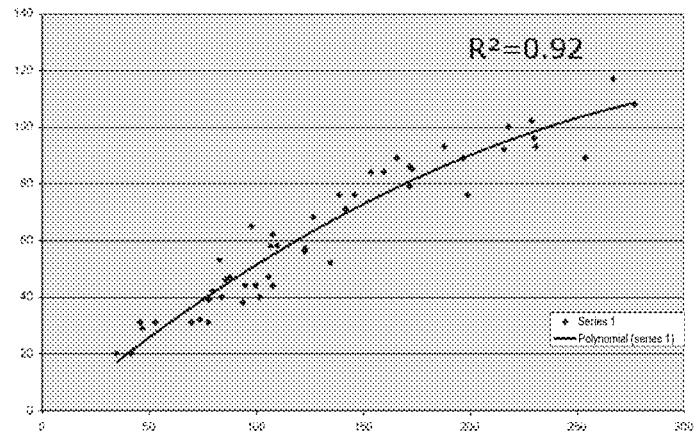
FIG. 2 schematically represents an exemplary matching of a number of berries that are visible on a photographic image with a number of berries actually counted on a cluster.

This model can be constructed by matching results provided by the previous step on the number of visible berries for a cluster with a manual measurement of the total number of berries on this same cluster. FIG. 2 illustrates such a matching.

The abscissa axis indicates the actual number of berries per cluster (that is to say counted manually). The ordinate axis indicates the number of visible berries, which number is determined automatically by the calculator MC on the basis of a digital image representing the same cluster. Each cluster is represented by a dot (corresponding to the legend "series 1").

A very strong correlation is noted, making it possible to determine a reliable polynomial model with $R^2=0.92$. For each image, this model makes it possible to automatically determine the true number of berries per cluster in 47% of cases, with a mean error of less than 2.5%.

It is possible to adapt this model as a function of the type of cultivar, for each vineyard operation, etc.

It is also possible to adapt this model to the parameters of the previous step. Indeed, depending on the degree to which a circular arc is taken into account to bring about the detection of a berry, the number of visible berries per cluster will be different, but it is possible to adapt the polynomial model to determine the actual number of berries, so that this actual number is independent of certain parameters of the algorithm for detecting the berries.

A following step of the method, implemented by the calculator MC, according to some embodiments, can include or can consist of estimating a number of clusters for a vine stem.

This step is based on counting the number of clusters that are visible on the processed photographic image, for a given vine stem. Thereafter, a chart can be used to deduce therefrom the actual number of clusters on this vine stem. The chart is also determined experimentally and makes it possible to take account of the clusters that are masked by vine leaves.

This chart can depend on the type of cultivar and also on the vine handling techniques: depending on the way in which the operator prunes their vine, a different chart may be used.

On the basis of the number of berries on a cluster, of the number of clusters on a stem and of the diameter of the berries, the calculator MC can estimate the harvest volume.

The diameter of the berries is a significant parameter since it enables a volume of the berry, and therefore a weight, and, consequently, a quantity of grape juice that can be extracted therefrom, to be provided directly. Furthermore, measurement of this diameter makes it possible to obtain an indication regarding the degree of maturity of a vine and to better determine both the right moment for a harvest and also the possible anomalies in the development of the vine.

Consequently, the harvest volume estimated by the steps of some embodiments affords a good estimation of the yield of a vine and optionally makes it possible to determine a moment which optimizes this yield.

Thus, the method according to some embodiments makes it possible to achieve a very good estimation, at lesser cost than the schemes of the known related art. Furthermore, it is not destructive, and thus can therefore be used repeatedly, when appropriate, if it is desired to refresh the estimation over time (for example, at regular intervals, or else following bad weather, etc.).

According to one embodiment of some embodiments, the system S includes a geolocation device DL. This device can be a simple GPS ("Global Positioning System") or GNSS ("Global Navigation Satellite System") device. It enables each photographic image to be associated with a geographical position.

Thus, it is possible to determine location-dependent volume indicators. A function relating a harvest volume indicator to the location may for example be determined.

This geolocation of the indicator makes it possible to refine the knowledge that the operator may have concerning their vineyard operation. It makes it possible in particular to adapt the response to be effected in a more precise manner and to detect local anomalies. In the event of an anomaly being detected, the geolocation also makes it possible to intervene on the corresponding site.

The calculator can make it possible to distinguish the berries at the stage of small buds on the basis of the determination of the mean diameter of the berries. This allows earlier estimation.

Advantageously, the whole device is protected by a leaktight casing fixed for example to the front of a vehicle. Thus, the device is robust to vibrations, to dust, to certain shocks and to splashing of liquids or mud. The presence of the casing can also afford the device protection to temperature variations.

Advantageously, the control of the system relies on a prior recording of the contour of the plots to be visited. Once inside a plot of interest, the photographic device DP can begin taking images. Acquisition henceforth becomes completely automatic. It is not desired in this embodiment to trigger the picture-taking manually at the start and end of a line.

The system can includes a transmission which can dispatch the images to a display device. This makes it possible to follow in real time the information obtained after completing the processing of the images and to verify the quality of the images.

According to another embodiment of some embodiments, the processing and the analysis of the images can be performed directly by the calculator MC integrated into the system. According to another embodiment of some embodiments, the processing and the analysis of the images are performed by the calculator MC integrated into a computer situated remotely from the system and accessible via a telecommunication network.

The presently disclosed subject matter is not limited to the examples and embodiment described and represented, but it is susceptible of numerous variants accessible to the person of ordinary skill in the art.

The invention claimed is:

1. A method for estimating a harvest volume within a vineyard operation organized by row of vine stems, the method comprising: capturing of a photographic image of a set of vine stems, by a photographic device secured to an automatic system circulating between two rows of vine stems; detecting of the berries within the photographic image; estimating of a number of berries on a cluster; estimating of a number of clusters on a stem of the set; estimating a volume on the basis of the number of berries on the cluster, of the number of clusters on the stem and of an estimated diameter of the berries which is determined on the basis of the photographic image and of a measurement of distance between the set of vine stems and the automatic system; and distinguishing berries at a stage of small buds, which is determined on the basis of the estimated diameter of the berries, which allows earlier estimation.

2. The method as claimed in claim 1, wherein the detection of berries includes determining of circular shapes within the photographic image.

3. The method as claimed in claim 2, wherein the estimation of the number of berries on the cluster includes using an experimental model relating the number of berries that are visible on the photographic image to the number of berries on the cluster.

4. The method as claimed in claim 2, wherein the number of clusters on the stem is determined by a chart dependent on a cultivar of the stem, and a vine handling technique implemented by an operator of the vineyard operation.

5. The method as claimed in claim 2, wherein the harvest volume is dependent on a geographical location.

6. The method as claimed in claim 1, wherein the estimation of the number of berries on the cluster includes using an experimental model relating the number of berries that are visible on the photographic image to the number of berries on the cluster.

7. The method as claimed in claim 6, wherein the number of clusters on the stem is determined by a chart dependent on a cultivar of the stem, and a vine handling technique implemented by an operator of the vineyard operation.

8. The method as claimed in claim 6, wherein the harvest volume is dependent on a geographical location.

9. The method as claimed in claim 1, wherein the number of clusters on the stem is determined by a chart dependent on a cultivar of the stem, and a vine handling technique implemented by an operator of the vineyard operation.

10. The method as claimed in claim 9, wherein the harvest volume is dependent on a geographical location.

11. The method as claimed in claim 1, wherein the harvest volume is dependent on a geographical location.

12. A system for estimating a harvest volume within a vineyard operation organized by rows of vine stems, the system comprising: a photographic device configured to capture a photographic image of a set of vine stems, when the system circulates between two rows of the vineyard operation; a device configured to measure a distance between the set of vine stems and the photographic device; and a calculator configured to detect berries within the photographic image, determine a number of berries on a cluster, determine a number of clusters on a stem of the set, determine an indicator of the volume as a function of the number of berries on the cluster, of the number of clusters on the stem and of an estimated diameter of the berries which is determined on the basis of the photographic image and of the distance measurement, and distinguish berries at a stage of small buds, which is determined on the basis of the estimated diameter of the berries, which allows earlier estimation.

13. The system as claimed in claim 12, wherein the calculator is designed to detect the berries by determining circular shapes within the photographic image.

14. The system as claimed in claim 13, wherein the calculator is designed to determine the number of berries on the cluster by using an experimental model relating the number of berries that are visible on the photographic image to the number of berries on the cluster.

15. The system as claimed in claim 13, wherein the calculator is designed to determine the number of clusters on the stem as a function of a chart dependent on a cultivar of the stem and a vine handling technique implemented by an operator of the vineyard operation.

16. The system as claimed in claim 12, wherein the calculator is designed to determine the number of berries on the cluster by using an experimental model relating the number of berries that are visible on the photographic image to the number of berries on the cluster.

17. The system as claimed in claim 16, wherein the calculator is designed to determine the number of clusters on the stem as a function of a chart dependent on a cultivar of the stem and a vine handling technique implemented by an operator of the vineyard operation.

18. The system as claimed in claim 12, wherein the calculator is designed to determine the number of clusters on the stem as a function of a chart dependent on a cultivar of the stem and a vine handling technique implemented by an operator of the vineyard operation.

19. The system as claimed in claim 12, further comprising a location device configured so as to render the harvest volume dependent on a geographical location.

20. A vehicle, comprising:
the system as claimed in claim 12.

* * * * *